United States Patent [19]

Allen et al.

[11] 4,380,303
[45] Apr. 19, 1983

[54] MOLDED CONTAINER AND OPENING MEANS THEREFORE

[75] Inventors: David O. Allen, Wilmington; Harry A. E. Wombold, Dayton, both of Ohio

[73] Assignee: Buckeye Molding Company, New Vienna, Ohio

[21] Appl. No.: 205,429

[22] Filed: Nov. 10, 1980

[51] Int. Cl.³ .............................................. B65D 17/40
[52] U.S. Cl. ..................... 220/276; 220/67; 220/270
[58] Field of Search ............................... 220/270–273, 220/276, 67, 66; 150/0.5

[56] References Cited

U.S. PATENT DOCUMENTS

| | | | |
|---|---|---|---|
| 3,334,775 | 8/1967 | Klein et al. | 220/48 |
| 3,334,777 | 8/1967 | Smyth | 220/54 |
| 3,773,209 | 11/1973 | Schane | 220/54 |
| 3,940,103 | 2/1976 | Hilaire | 246/68 |
| 3,981,412 | 9/1976 | Asmus | 220/276 X |
| 4,155,698 | 5/1979 | Aichinger | 425/556 |
| 4,171,062 | 10/1979 | Allen | |
| 4,190,175 | 2/1980 | Allen | 220/270 |

Primary Examiner—George T. Hall
Attorney, Agent, or Firm—Dybvig & Dybvig

[57] ABSTRACT

An essentially straight walled, minimally tapered or non-tapered container is provided with a radially outwardly projecting chime or bead formation which enables gripping of such container when molded to facilitate removal of the container from an injection mold apparatus. The described molded part extraction technology allows the formation of a novel easy-open closure in which the easy-openable closure structure is injection molded and may be one piece with a container side wall. The disclosure also includes a description of two forms of molding method and apparatus suitable for accomplishment of the described technology. The novel easy openable closure structure includes a closure panel forming a side wall which is inwardly convergent from one end of the container. A weakened web connects the closure panel to the container. The closure panel is provided with other weakened webs and a pull ring which enables removal of the closure panel by a pulling force exerted on the pull ring.

21 Claims, 16 Drawing Figures

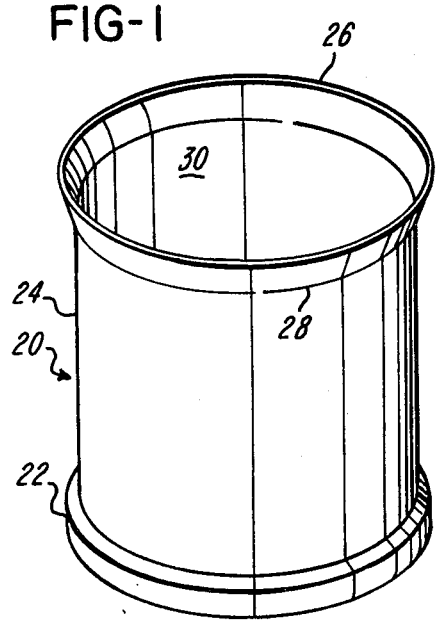
FIG-1
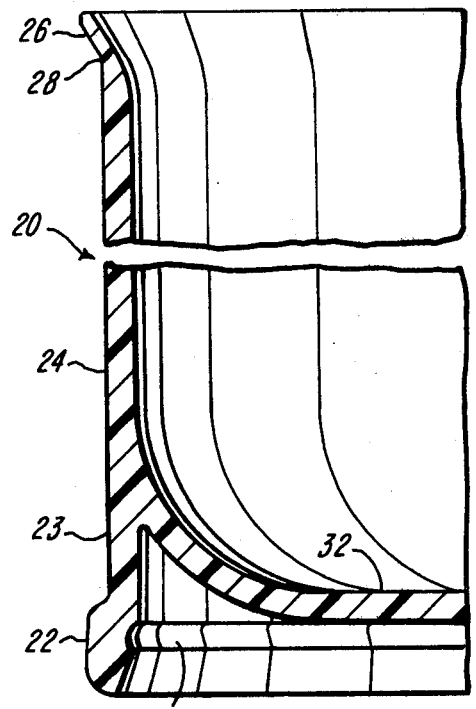
FIG-2
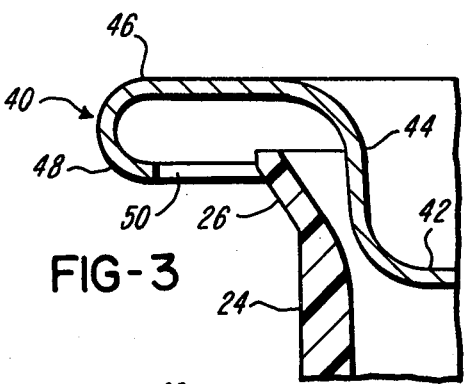
FIG-3
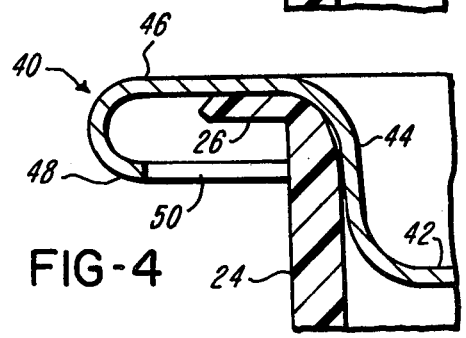
FIG-4
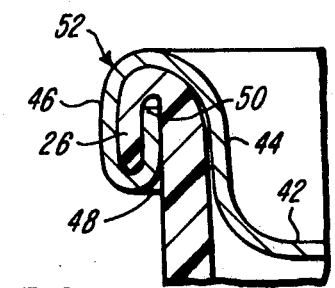
FIG-5
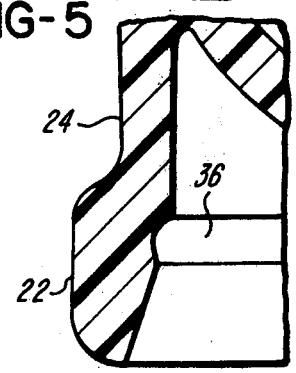

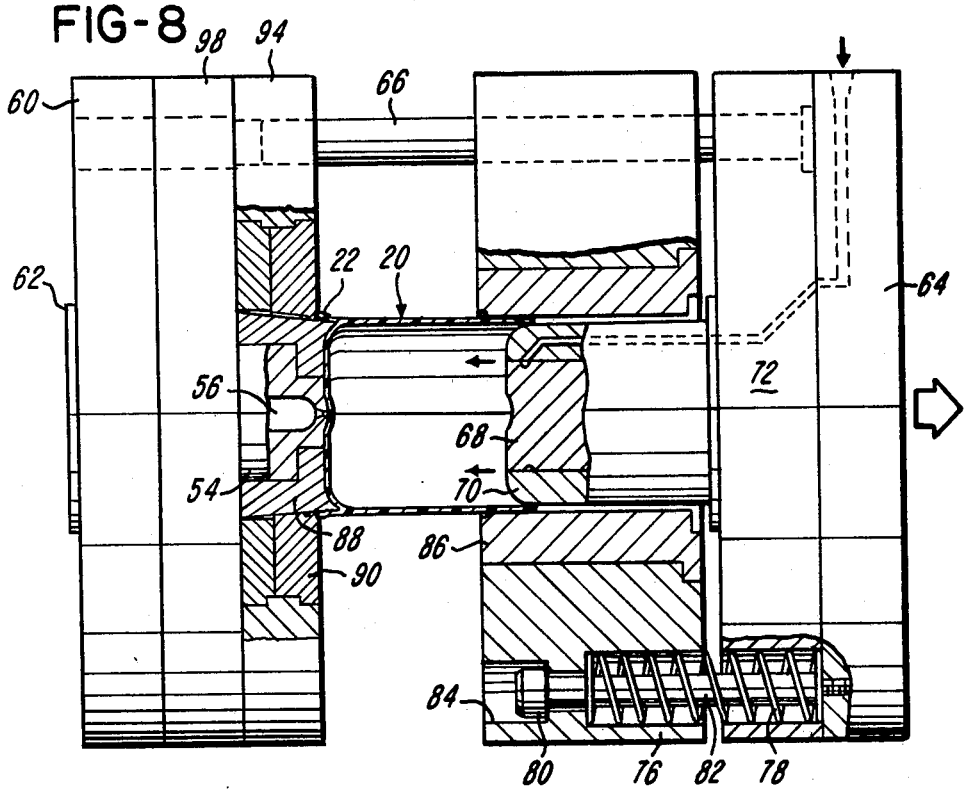
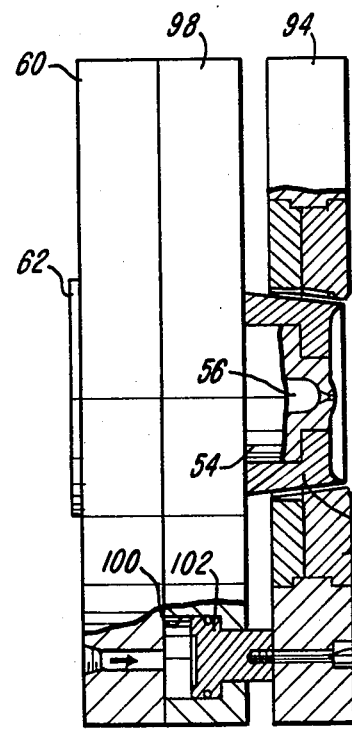
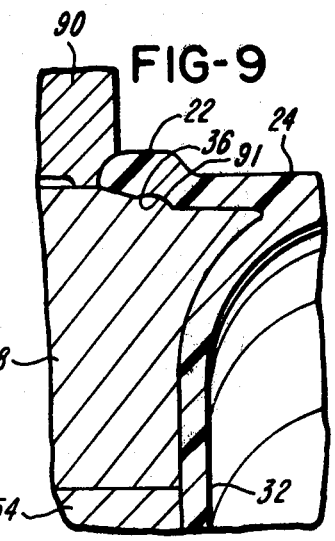

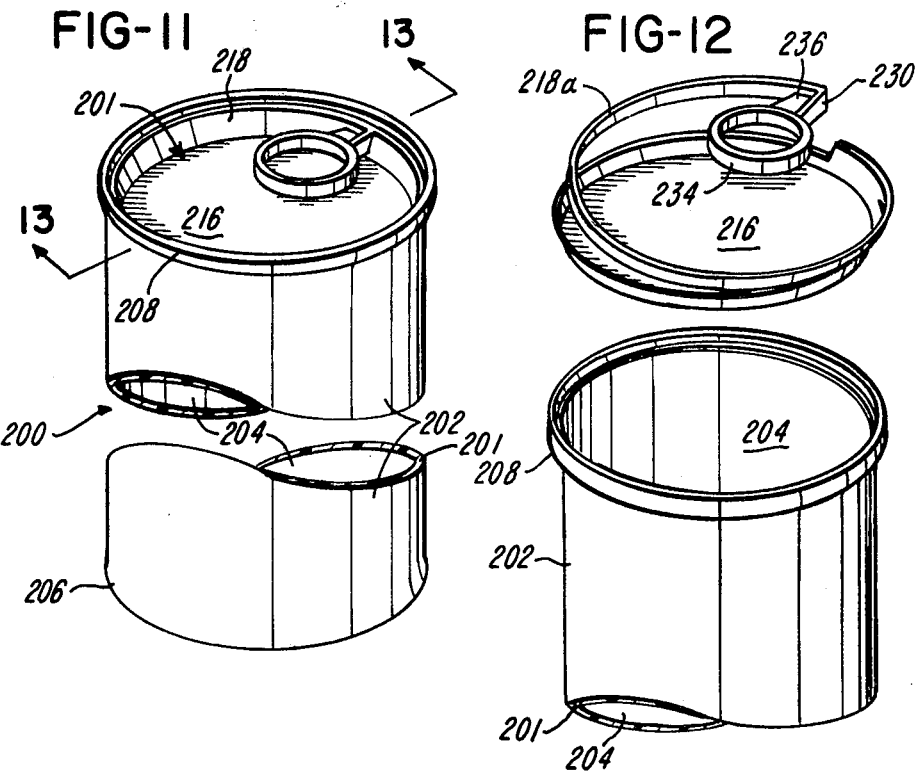
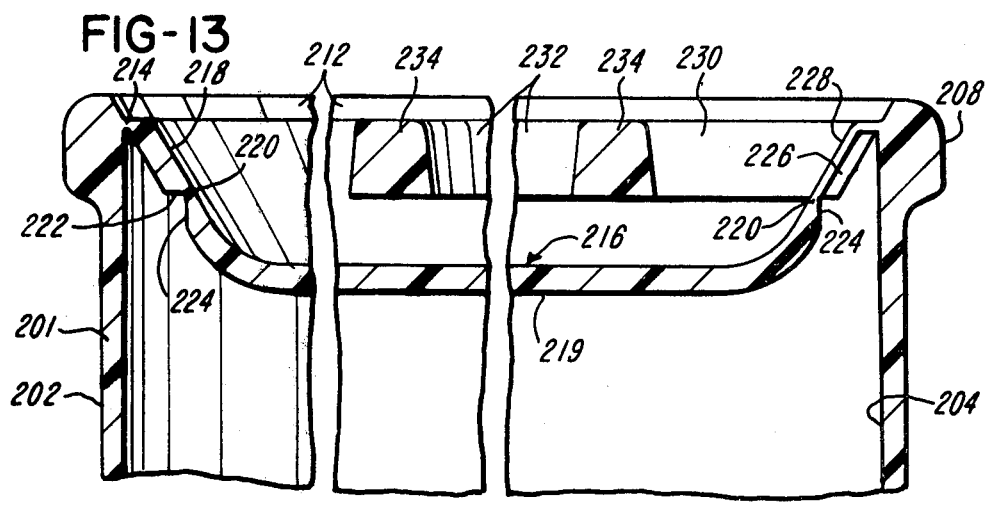

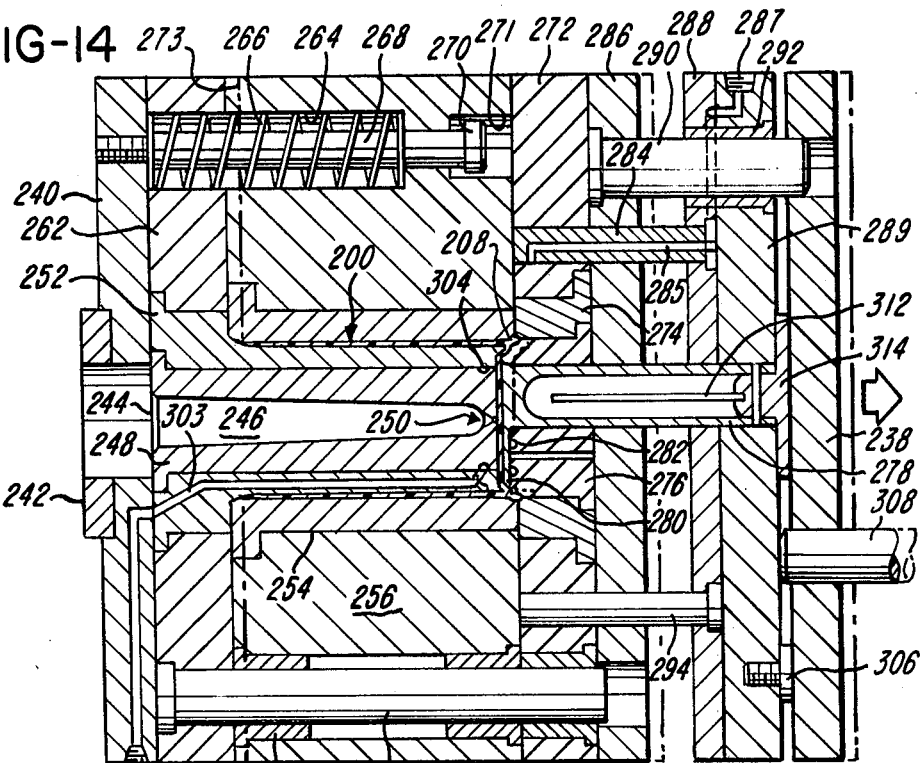
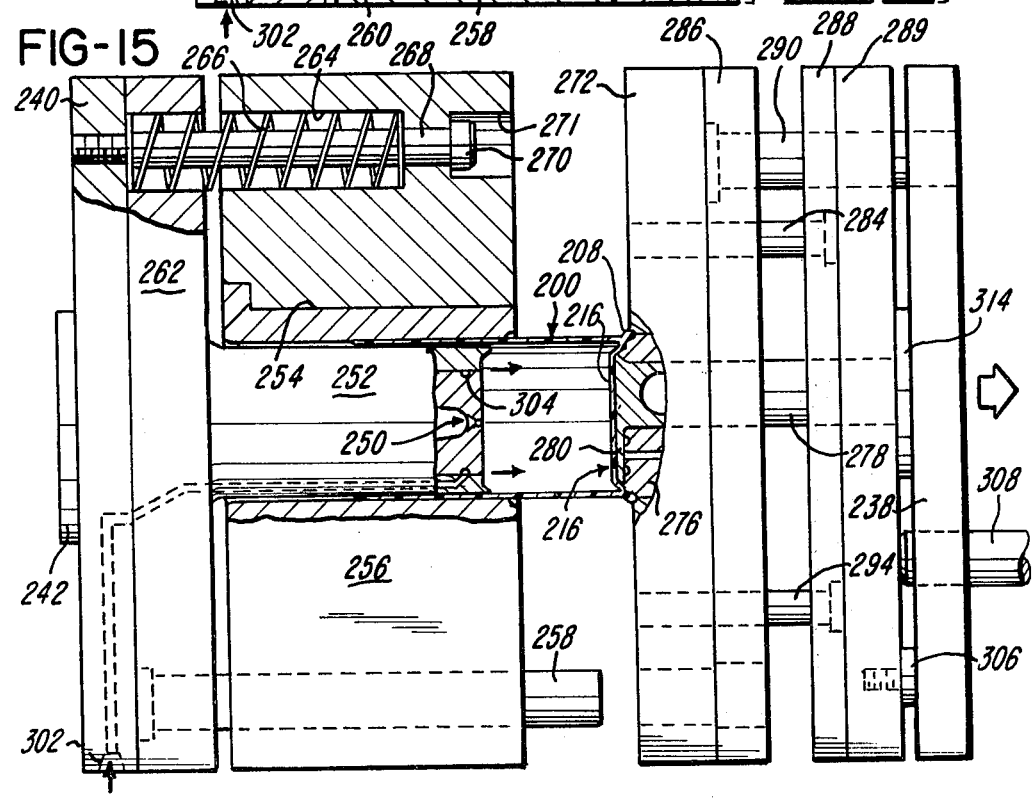

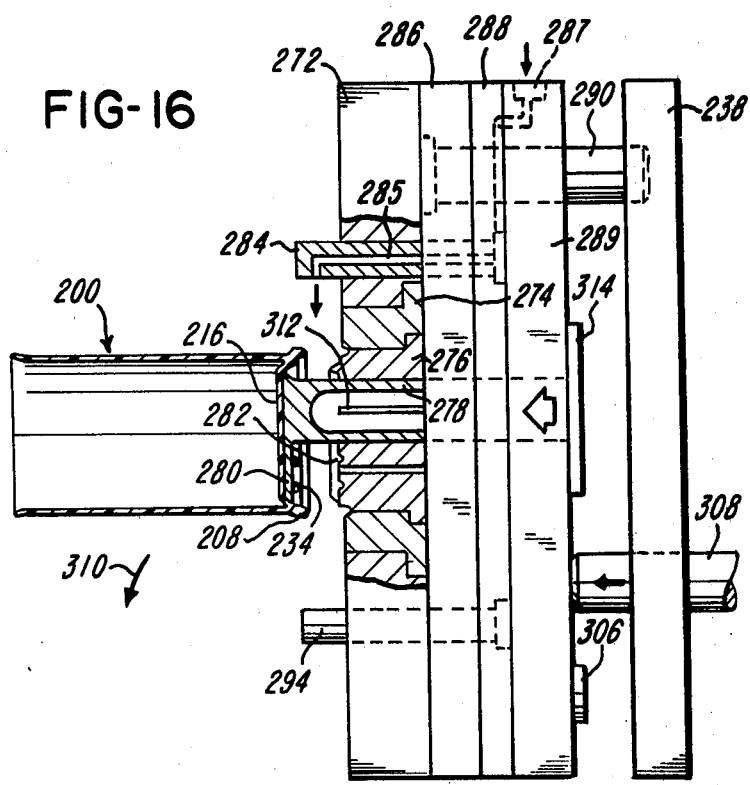

MOLDED CONTAINER AND OPENING MEANS THEREFORE

BRIEF SUMMARY OF THE INVENTION

The present invention concerns the formation of an injection molded plastic container which has an outside wall having throughout at least a part of its vertical height a right-cylindrical shape, thus to enable convenient labeling, and which has an outwardly projecting surrounding bead or chime which, when the container structure is molded, provides a surface for positive engagement of the molded part to enable a forced separation of the molded part from the core structure about which, and the cavity structure within which, the part has been formed. This use of a chime or bead for positive engagement of the molded part allows the formation of a novel container, one end of which has an integrally molded closure means produced as one piece with a container portion, the other end of which is adapted to be provided with a separately formed closure. Either the integral closure means or the separately formed closure may be of the easy open type.

The forced separation of the molded part from the core structure occurs in two identifiable steps which may proceed in uninterrupted sequence. During the first step, there is a sliding motion between the molded part in and the core structure without relative motion between the molded part and the cavity structure surrounding the molded part. During the second step, the molded part moves relative to both the core structure and the cavity structure until the molded part is separated from both the core structure and the cavity structure. Thereafter, the molded part is stripped from the injection mold.

The surface of the outwardly projecting bead or chime engaged during molding surrounds the end of the container part which is closed by the integral closure means that is molded in one piece with the outside wall of the container. During the first step in the formed separation of the molded part from the core structure, the integral closure means is separated from the confronting end face of the core structure so that a spacing is formed therebetween. Air under pressure is then introduced into such spacing through the core structure to blow the container blank off the core structure. To prevent doming of the integral closure means by the pressurized air, the closure means abuts against the surface of the mold confronting the end surface of the core structure. During the above mentioned second step, the molded part continues to move relatively away from the core structure with the assistance of the air under pressure even though the surrounding cavity structure no longer positively engages the container bead or chime.

To facilitate subsequent handling, such as palletizing, the chime or bead structure is also designed to provide the radially outwardmost projection of the molded part. In one embodiment, the core structure about which the container is molded projects axially away from the sprue through which plastic is injected. In another embodiment, the core structure about which the container is molded is disposed in surrounding relationship to the sprue through which the plastic to be molded is injected.

Both embodiments involve forced separation of a container part having a right-cylindrical inner wall surface from essentially draft free core and cavity structures between which it is formed.

In the embodiment of a container having an integral closure, the container includes a tubular body having a chime at one end. The closure includes a closure panel spaced inwardly of the container from the chime. A continuous, circular, weakened first web bridges the space between the chime and the closure panel and extends circularly about the panel and the closure panel has an integrally formed side wall which converges inwardly into the container from said web. The closure panel also has a second weakened web defined by a notch facing inwardly of the container and extending parallel to the first web. A third, connecting web defined by a groove in the panel side wall extends from the first web to the second web. The closure panel may be removed by manually pulling on a pull open means that is one piece with the side wall and disposed adjacent the connecting web. The second web desirably extends at an angle of less than 360° so that rupturing of the second web terminates before rupturing of the first web is completed and the manual pulling of the pull means can entirely free the closure panel from the container. The pull open means may comprise a ring member with a spoke connecting it to the closure panel side wall.

BRIEF DESCRIPTION OF THE DRAWINGS

In the drawings:

FIG. 1 is a perspective view of a container blank having an open upper end in accordance with the present invention.

FIG. 2 is a fragmentary sectional view of the container blank.

FIGS. 3, 4 and 5 illustrate the progressive steps involved in the double-seamed application of a metal closure to the container blank of the present invention.

FIG. 8 is a side elevation view of the mold apparatus of FIG. 7 with portions broken away to reveal various operating features of the mold apparatus, the mold apparatus being illustrated during separation of the container blank from the core structure.

FIG. 9 is an enlarged fragmentary illustration of a portion of the mold apparatus and a portion of the molded container blank illustrating container blank retention before container blank ejection.

FIG. 10 is a further fragmentary side elevation view of a portion of the mold apparatus and the molded container blank at the time of ejection of the blank.

FIG. 11 is a perspective view of a modified container blank having its upper end closed by easy-open closure means constructed in accordance with the present invention, a central portion of the container blank having been broken away.

FIG. 12 is an exploded perspective view of the modification with the lower portion of the modified container blank broken away and with the easy-open container closure means having been separated away from the top portion of the container blank.

FIG. 13 is an enlarged section view taken along the line 13—13 of FIG. 11, with portions broken away.

FIG. 14 is a section view comparable to that of FIG. 7 illustrating a mold apparatus for molding the container blank illustrated in FIGS. 11, 12 and 13.

FIG. 15 is a side elevation view with portions broken away, similar to FIG. 8 and illustrating the mold apparatus of FIG. 14 during separation of the container blank from the core structure.

FIG. 16 is a side elevation view of a portion of the mold apparatus of FIGS. 14 and 15, portions of such apparatus having been broken away so as to reveal interior detail, and a container blank about to be discharged from the mold apparatus, the blank being illustrated in cross-section.

DETAILED DESCRIPTION

Figure 6:
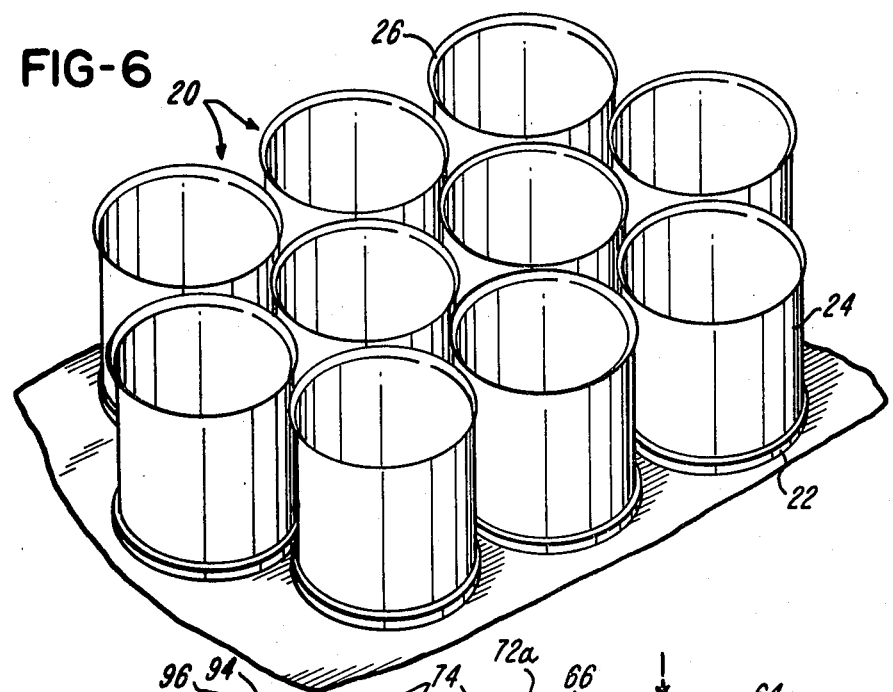
FIG. 6 schematically illustrates a plurality of the formed container blanks mounted upon a pallet structure.

It has become common practice to injection mold plastic container blanks utilizing a mold having a core structure about which the container side wall is formed, the container blank having an integral, one-piece molded end formed in a mold space abutted in part by the end face of the core structure. The core structure is surrounded by a cavity. Typically, the cavity is removed from the core and the molded part when the molding operation is completed and the molded part then stripped from the core by operation of a stripper member.

A phenomena associated with the molding of containers is that the container side wall tends to shrink as it cools and thus seize upon the core structure. Accordingly, there may be substantial frictional resistance to removal of the container from the core structure and it is common practice to form the core structure with a draft to facilitate removal of the molded container therefrom. In those cases where the container structure has a side wall of more than an insubstantial depth and a relatively shallow draft, it has become common practice to supply air under pressure through a passageway in the core structure opening to the end face of the core structure to assist in removal of the molded container from the core structure by, in effect, blowing the container away by air pressure exerted on the container end wall. If the container has substantial depth and the core structure has little or no draft angle, the practice of introducing air under pressure through the end face of the core structure can be somewhat self defeating in that the end wall of the container will tend to dome outwardly under the influence of air pressure whereupon the container's side wall is drawn more tightly against the core structure.

As will become apparent, improved techniques are described in the present application which allow the container and the core structure to be relatively moved from one another with the consequence that containers having a substantial depth may be molded with very little draft and even no draft at all.

FIGS. 1 and 2 illustrate a container blank 20 shaped in accordance with the present invention. The container blank 20 is characterized by a right-cylindrical outer wall surface 24 and an interior wall surface 30 which is throughout most of its vertical length substantially parallel to the wall surface 24.

The generally cylindrical container wall bounded by the surfaces 24 and 30 merges into a smoothly rounded bottom wall or end closure 32. An extension of the wall bounded by the outside and inside surfaces 24 and 30 beyond its merger with the end closure 32 forms a skirt 23 which is enlarged at its lower end by a radially outwardly projecting chime 22. At its inside margin, the chime 22 has an annular recess 36 whose function will become apparent in succeeding remarks.

The mouth of the blank 20 can be seen to be surrounded by an upwardly sloped flange portion 26, the radial outer reach of which is deliberately smaller than the radial outer reach of the chime 22. The sloped flange 26 can be seen to form a sharply defined inclined angle 28 with the outer container surface 24 and to have a thickness notably smaller than the wall thickness between the container surfaces 24 and 30.

FIG. 3 illustrates the positioning of a sheet metal closure 40 upon the flanged mouth of the container blank 20.

FIG. 4 illustrates how a downward force applied to the closure 40 is capable of changing the sloped position of the flange 26 so as to cause the lower surface of such flange to form a right angle with the adjacent cylindrical surface 24. For the accomplishment of this right angle relationship as illustrated in FIG. 4, it is important for the flange 26 to have a thickness which is notably smaller than the thickness of the container wall bounded by its inner and outer surfaces 30 and 24. The particular material for which the illustrated flange design is applicable is a high-density polyethylene. However, numerous other thermoplastic materials can be similarly shaped to automatically form the right angular configuration illustrated in FIG. 4 upon application of a downward pressure as discussed. The aforementioned right angular alignment between the flange 26 and the outside wall surface 24 assumes importance when one considers the method and apparatus procedures involved in rolling and thereby reshaping the sheet metal closure 40 so as to produce a double-seam 52 between the closure 40 and the mouth of the container blank 20.

Before description of the rolling to complete the double-seam 52 is commenced, it can be noted that the closure 40 has been preformed in conventional fashion so as to have a base panel 42 integral with an upstanding annular wall portion 44 which will pilot the closure 40 into the mouth of the container blank 20. An outwardly projecting flange 46 surrounding the wall portion 44 terminates with a precurved re-entrant lip portion 48 having an edge margin 50 at the re-entrant end of the lip portion 48. Upon application of a downward pressure to the closure 40 to produce the right angle container flange configuration illustrated in FIG. 4, conventional rolling dies, not shown, which cooperate to progressively roll the lip portion 48 inwardly and thereby progressively reduce the radial outward extent of the outwardly projecting flange 46, progressively advance the edge 50 under the flange 26 and upwardly to nearly contact the underneath surface of the flange 26. For the achievement of the final configuration of the double-seam 52 illustrated in FIG. 5, it was initially important that the flange 26 has a thickness substantially smaller than the wall thickness between the surfaces 24 and 30 and made a sharply defined included angle at its juncture 28 with the outside wall surface 24. These conditions having been met, it then became possible to employ conventional commercially available double-seam rolling dies to accomplish the rolled metal and plastic double-seam 52.

The container blank 20 is designed to be injection molded with optimally minimum cycle times and it can be appreciated that the molded container blanks when ejected from the molding apparatus will remain warm and not yet set to a fixed configuration. In normal production, the still warm blanks 20 are next palletized, as illustrated in FIG. 6. To allow a maximum opportunity for the palletized, but still warm, blanks to set by cooling, with true circularity at the mouth of each of the container flanges 26, it was found desirable to design the chimes 22 with an outside reach exceeding the outside reach of the flanges 26, so that as the blanks are palletized and pushed laterally on the pallet, only the chimes 22 will contact one another, and the size of each chime will be adequate to prevent the flanges 26 of adjacent blanks from pressing one against the other so as to become distorted away from reasonably true circularity.

Figure 7:
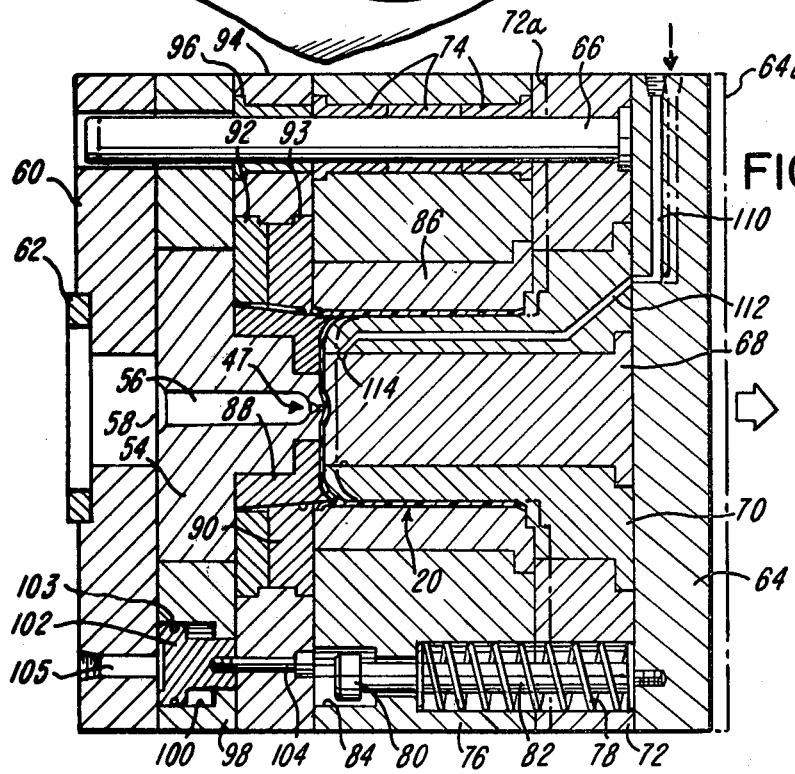
FIG. 7 is a sectional view illustrating mold apparatus suitable for molding the container blank of the present invention and illustrating a molded container blank residing in such apparatus.

Apparatus and method technology with which the container blanks illustrated in FIGS. 1, 2 and 5 are produced will now be described with reference to FIGS. 7, 8, 9 and 10. FIG. 7 illustrates the molding apparatus after injection of plastic to produce a container blank 20 such as illustrated in FIG. 1. Accordingly, features of the container blank 20 illustrated in FIGS. 7-10 which are common to those features already described in reference to FIG. 1, have been assigned the same reference numbers as were employed in FIG. 1.

For purposes of a simplified illustration of the molding apparatus, only one gated sprue bushing serving a single mold cavity is illustrated. Those skilled in the art will appreciate, however, that production molding apparatus may often include several gated sprue bushings each serving a separate mold cavity.

The molding apparatus illustrated in FIG. 7 comprises a sprue bushing 54 fixedly clamped to a stationary clamp plate 60. The sprue bushing 54 surrounds a sprue chamber 56 and defines a gate 47 through which plastic to be molded with the apparatus being described is delivered. Plastic normally present in the chamber 56 has been omitted from the drawings. The left-hand end of the sprue chamber 56 is enlarged to provide a seat 58 against which is seated a conventional plastic injection nozzle, not shown. Fixedly mounted in the left face of the clamp plate 60, as it appears in FIG. 7, is a locator ring 62 which fits into a counter-bore and the stationary platen (not shown) of the molding machine with which the apparatus of FIGS. 7-10 is used.

Spaced apart from the stationary clamp plate 60 is a movable clamp plate 64. Movements of the clamp plate 64, which will be later described, are guided by a group of axially parallel guide pins 66, only one of which appears in FIG. 7. A typical single cavity molding apparatus constructed in accordance with the present invention will have four such guide pins spaced apart in an array surrounding the sprue bushing 54.

Abutting the movable clamp plate 64 is a core insert 68, such insert being a cylindrical body disposed coaxial to the sprue chamber 56. Telescopically fitted on the core insert 68 is an annular core 70. The core insert 68 can be seen to have a flanged outer end received within an interfitting annular well formed in the core 70. The core 70 likewise has an outwardly projecting annular flange seated against the clamp plate 64 and received within a circular interfitting well formed within the face of a core plate 72 which confronts the movable clamp plate 64. By suitable bolt means not illustrated in the drawings, the core plate 72 is affixed to the clamp plate 64 and, when so affixed, clamps the core 70 and the core insert 68 against the movable clamp plate 64. As the core plate 72 is bolted in position on the clamp plate 64, the several guide pins 66 are also clamped in their respective positions.

Those skilled in the art will appreciate that FIG. 7 has been simplified by the omission of numerous features, such as sealing rings, cooling water passageways, and air vents which are well known and are conventional in the art.

Stacked upon each of the guide pins 66 are a plurality of bushings 74 received within suitably located bores which pass through a cavity plate 76, such bores being concentric each to one of the guide pins 66. The cavity plate 76 has a centrally located bore which telescopically receives an annular cavity member 86 having a surrounding flange, at the right end of the cavity member 86 as it appears in FIG. 7, seated within an annular channel formed in the right face of the cavity plate 76 so that plate appears in FIG. 7. The cavity member 86 has an interior wall spaced outwardly from the exterior wall of the core 70 so as to define an annular chamber for receiving the plastic injected into the mold apparatus through the sprue chamber 56. Bolt means, not illustrated, but passing through the flange of the cavity member 86 to engage the cavity plate 76, cause the cavity member and cavity plate to move as one piece.

The cavity plate 76 can be seen in FIG. 7 to have a bore coaxially aligned with an equally shaped bore in the core plate 72, such bores cooperating to confine a compressed spring 78. Passing centrally through the convolutions of the compressed spring 78 is a stripper bolt 82 having an enlarged head 80 received within a suitably enlarged bore 84 located in the cavity plate 76. While FIG. 7 illustrates only a single expansion spring 78 and associated stripper bolt 82 threaded into the clamp plate 64, it can be appreciated that the mold apparatus will include a plurality, such as four, of such stripper bolts forming a circular array of such bolts surrounding the central axis of the sprue chamber 56.

Interfitting the right end of the sprue bushing 54 as it appears in FIG. 7 is a cavity insert 88 which cooperates with the sprue bushing 54, the core 70 and the core insert 68 to define the boundaries of the container blank formed by molten plastic injected through the sprue chamber 56 and flowing radially outwardly and then rightwardly into the annular chamber formed between the interior wall of the cavity member 86 and the exterior wall of the core 70. It can be noted that the cavity insert 88 has its surrounding wall spaced inwardly from the interior wall of the cavity member 86, with the result that the skirt 23 is permitted to form by a flow of plastic to the left as appears in FIG. 7 which also forms the chime 22 that will project outwardly from the base of the container being molded. FIG. 7 illustrates the cross-sectional shape of the container 20 molded with the apparatus of FIG. 7.

The leftward flow of the injected plastic to form the aforementioned chime 22 proceeds between a stripper ring 90 and the cavity insert 88 which is surrounded by the stripper ring. As shown in FIG. 9, the cavity insert 88 is shaped to have an annular bead 91 about which the interior groove 36 of the chime 22 appearing in FIG. 1 is formed. The fit between the inside surface portions of the stripper ring 90 and the outside surface of the cavity insert 88 is sufficiently loose that air displaced by the downward flow of the injected plastic to form the container chime 22 will be vented downwardly between the cavity insert and the stripper ring and can be further vented downwardly between the cavity insert and a surrounding stripper ring retainer 92 which is fastened by means, not shown, to the stripper ring 90. The stripper ring retainer 92 which has an outwardly projecting shoulder is keyed by such shoulder to a stripper plate 94 embraced by shoulders of the stripper ring 90 and plate 94.

Surrounding the sprue bushing 54 and telescopically received thereabout is a force plate 98. The force plate 98 bears against the stationary plate 60 and is clamped thereto with the aid of suitable retaining bolts, not illustrated. The stationary clamp plate 60 and the force plate 98 clamped thereto are through-bored at suitable locations to receive the aforementioned guide pins 66, such through-bores being larger in diameter than the guide pins 66.

Slidably mounted within a bore 100 located in the force plate 98 and confronting the stationary clamp plate 60 is a stripper piston member 102 sealably mounted in the bore 100 by means of an O-ring 103. As will be explained, air under pressure is arranged to be delivered to the piston member 102 at a proper time in the operating cycle through an air inlet 105 communicating through the stationary clamp plate 60 with the bore 100. While FIG. 7 illustrates only a single piston member 102 and associated air inlet, the entire apparatus being described would include a plurality of such piston members and air inlets, the total number typically being four piston members and associated inlets.

The several piston members 102 are each fixedly clamped to the stripper plate 94 by means of a bolt 104, only one of such bolts appearing in FIG. 7. Upon a delivery of air under pressure to each of the several air inlets 105, as will be described, the several stripper pistons 102 are driven to the right as appears in FIG. 7, thus to move the stripper plate 94 to the right, the designed extent of this movement being approximately ¼".

As conventional, the molding machine has a movable platen (not shown) upon which the clamp plate 60 is mounted and which exerts the force needed to hold the mold closed during injection of the molten plastic. The molding machine would also have associated therewith a pressure supply means, not illustrated, for delivering air under pressure to an air conduit 110 which is formed to pass through the body of the movable clamp plate 64. The passage 110 progresses to the left as shown in FIG. 7 to exit through the left face of the movable clamp plate 64 in alignment with a leftward progressing conduit 112 formed in the core 70. The leftward end of this conduit aligns with an annular groove 114 formed adjacent the leftward end of the core insert 68, which leftward end is preferably undersized approximately 1 mil to allow air to escape leftwardly toward the molded container base.

In the operation of the apparatus upon completion of the injection portion of the operating cycle, the movable platen (not shown), which controls the position of the movable clamp plate 64, moves the clamp plate 64 to the right as shown by arrows in FIGS. 7 and 8. The clamp plate 64 draws with it the core 70 and the core insert 68. Further, since the inside surface 30 of the molded container blank, on cooling, tends to shrink about the core 70, the righward movement of the clamp plate 64 tends to be followed by the freshly molded plastic container blank. To minimize this tendency, air under pressure is injected in the conduit 110 and through the conduit 112 so that the escape of air along the interface between the core 70 and the core insert 68 can bias or blow the container blank off the core 70 toward the confronting mold surfaces of the sprue bushing 54 and the cavity insert 88. Engagement of these surfaces prevents doming of the bottom wall of the container. Preventing the bottom wall from doming beneficially avoids the resultant tendency of the side wall of the container to draw inwardly and thereby increase its grip on the core 70. Dome prevention may also produce more desirable and uniform containers.

When the movable clamp plate 64 first retracts away from the fixed clamp plate 60 to withdraw the core 70 from within the freshly molded container blank, the pressurized air exiting from the annular groove 114 cannot act over the entire bottom wall of the container blank and may not be effective to prevent the container blank from moving with the core 70. In accordance with this invention, the chime 22 is positively gripped to hold the container blank immovable during the initial retraction of the core 70 until there is a small spacing between the bottom wall of the container blank and the confronting surfaces of the retracting core 70 and the core insert 68. The positive engagement of the chime 22 is obtained by maintaining the cavity member 86 engaged with the chime 22 during initial retraction of the core 70, whereupon the chime 22 is held captive within an annular chamber formed by cooperating surfaces of the cavity member 86, the cavity insert 88 and the stripper ring 90. The cavity member 86 is thus maintained engaged with the chime 22, as the clamp plate 64 is initially retracted, by potential energy previously stored in the compressed spring 78 acting against the cavity plate 76 for relatively short distance, as allowed by a predetermined spacing of the heads 80 of the stripper bolts 82 from the bases of the bores 84 which receive the bolts 82. Accordingly, the springs 78 hold the cavity plate 76 and the cavity member 86 stationary until the stripper bolt heads engage the aforementioned bases of the bores 84. FIG. 7 illustrates with broken lines 64a and 72a the limited movement of the movable clamp plate 64 and the core parts 68, 70 and 72 while the cavity plate 76 and the cavity member 86 are held stationary by the springs 78.

The leftward or rearward flow of the injected plastic to form the aforementioned skirt 23 and chime 22 is limited by the stripper ring 90 which surrounds the cavity insert 88. As shown, the stripper ring 90 is provided with a surrounding outwardly extending flange or bead 93 for interfitting loosely the interior wall of a stripper plate 94. The stripper plate 94 receives suitably located bushings 96 having guiding engagement with the guide pins 66. The fit between the inside surface portions of the stripper ring 90 and the outside surface of the cavity insert 88, as shown in FIG. 7, is sufficiently loose that air displaced by the leftward flow of the injected plastic to form the container chime 22 is readily vented to the ambient atmosphere.

After the described relatively short retraction of the movable clamp plate 64 from the fixed clamp plate 60, during which movement the pressurized air delivered to the conduit 110 has acted to hold the molded piece against the confronting surfaces of the sprue bushing 54 and the cavity insert 88, the movable clamp plate 64 is further retracted or moved to the right without interruption by a distance which approximates the interior depth of the molded part, thus to withdraw the core 70 and the core insert 68 entirely from within the confines of the molded part. As this continuing movement occurs, the bolt heads 80 of the stripper bolts 82 carry the cavity plate 76 and the cavity member 86 in the rightward direction and thus in following relation to the clamp plate 64. In consequence, the molded container part becomes supported only by the molded chime 22 and skirt 23 which continue to surround the cavity insert 88. With reference to FIG. 10, the molded part is next fully stripped from the mold apparatus by a delivery of air under pressure to air conduits 105 which deliver such pressured air to the stripper pistons 102. In response to this air pressure delivery, the stripper plate 94 is moved in the rightward direction, as seen in FIG. 7, for a distance limited by the depth of the bores 100 formed in the force plate 98. This rather limited movement imparted to the stripper plate 94 enables the stripper ring 90 to push the molded part off the cavity insert 88, whereupon the molded part falls downwardly and away from the mold apparatus, as indicated by an arrow in FIG. 10.

FIG. 9 illustrates the manner in which an annular bead 91 formed around the cavity insert 88 assists in retaining the chime 22 of the container blank 20 upon the cavity insert 88 until movement of the stripper plate 94 as above described. A noteworthy feature of the present invention, as illustrated in FIGS. 7 through 10, is the use of the illustrated mold apparatus to form an outwardly projecting means, such as the chime 22, and to utilize such chime for supporting the freshly molded and essentially non-tapered container as the core and core insert are extracted from within the freshly molded part.

Those skilled in the art will appreciate that the formation of a container surrounded by an essentially non-tapered wall extending between a double-seamed junction at one end of the container and a molded chime at the other end of the container, as shown in FIG. 5, offers the advantages that the right-cylindrical outer wall surface of the container provides a uniform surface ideally structured for labeling purposes and that the shape similarities of the chime 22 as compared to the double-seamed juncture 25 provide a container having pronounced similarities to tin can containers with which many customers are already familiar.

An extension of the technique of utilizing a container chime or a similar outwardly projecting structure for removal of an essentially non-tapered container blank from the apparatus in which the container blank has been molded appears in FIGS. 11 through 16 wherein FIGS. 11 through 13 illustrate an essentially non-tapered container blank 200 molded so as to have an integrally formed easy-open closure 201. FIGS. 14 through 16 illustrate mold apparatus which has been suitably modified for accomplishment of the one-piece molding of a container blank having an easy-open top and for discharging therefrom the uniquely molded part.

The container blank 200 is molded so as to have a substantially right-cylindrical wall 201 with a right-cylindrical outer wall surface 202 and a generally cylindrical interior wall surface 204 extending between an outwardly flared and tapered bottom flange 206, which is shaped for double-seamed closure engagement as heretofore discussed, and a closure chime 208 integrally connecting to the right-cylindrical container wall 201.

The upper end of the chime 208 as viewed in FIG. 13 can be seen to have an inwardly convergent interior wall 212 integrally attached to a closure panel 216 by means of a relatively thin and thus weakened web 214 which extends circularly about the panel 216.

The closure panel 216 can be seen to occupy a recessed position below the weakened web 214 by reason of a downwardly convergent side wall 218 surrounding an integrally formed bottom portion 219. The outside surface of the side wall 218 can be seen in FIG. 13 to contain an annular groove formed by an annular horizontally disposed undercut 222, intersected by an annular vertically disposed undercut 224, the intersection between such undercuts forming with the inside surface of the wall 218 a weakened and, therefore, severable web 220. This web 220 extends annularly about the downwardly convergent wall 218.

At a selected region illustrated to the right of FIG. 13, the outside surface of the convergent wall 218 is interrupted by a v-shaped groove which extends upwardly from the annular web 220 to reach, without disrupting the continuity of, the web 214. The section line 13—13 of FIG. 11 is so located that the section is taken at the apex of the described upwardly extending v-shaped groove with the result that only one side 226 of such vertically disposed groove appears in FIG. 13.

This vertically disposed groove defines with the inner surface of the wall 218 a web 228 which is notably thinner and thus weakened in comparison to the overall thickness of the panel 216.

As will be more fully explained in ensuing remarks, it is preferred that the container blank 200 be molded of a high-density polyethylene. Assuming the container blank to have been molded of a high-density polyethylene, the thickness of the web 228 is preferably in the range of 8 mils thickness. Likewise, the thickness of the web 214 as well as the thickness of the web 220 at the intersection of the undercut surfaces 222 and 224 is preferably in the range of 8 mils thickness.

Integrally molded as a part of the convergent wall 218 and surrounded thereby is a radially inwardly directed spoke portion 230 supporting an integrally formed pull-open ring 234 having a nearly cylindrical inside surface 232. The spoke portion 230 is reinforced on one side thereof by a flange 236 extending perpendicularly outwardly from one side of the spoke portion 230 and bridging radially between the convergent wall 218 and the pull-open ring 234, such reinforcing flange being one-piece with the spoke 230, the pull-open ring 234 and the convergent wall 218. As is evident in FIG. 12, the flange 236 is thin in relation to the vertical dimensions of the spoke 230 and the pull-open ring 234 and, as will be apparent, the thickness of the flange 236 may be set before molding to accomplish the purposes to be described.

The operation of the easy-open closure being discussed is best described in reference to FIGS. 11 and 12. For purposes of this discussion, one can assume the container to have been filled with a substance to be preserved in the container and the container to have been closed at the bottom thereof by a metal plate member rolled to double-seamed engagement with the tapered bottom flange 206 of the container blank 200 as has been previously discussed in reference to FIGS. 1 through 6 above. When access to the stored substance is thereafter desired, such access is gained by insertion of a finger in the pull-open ring 234 and the exertion of a lateral finger bias in the leftward direction as the container appears in FIGS. 11 and 12. This leftward bias places the left free edge of the flange 236 under a compressive force which is transmitted to the convergent wall 218 and the development of this compressive force is accompanied by the development of a tensive force along the spoke portion 230 which tends to pull the spoke portion away from the convergent wall 218. Since the wall 218 is both circular and convergent, the tension delivered along the spoke portion 230 is strongly resisted by the wall 218 and with progressive increase in the leftward force supplied by the operator's finger the web 228 ruptures. With this interruption to the integrity of the convergent wall 218, tearing of the webs 214 and 220 commences, the initial tearing of such webs being promoted by a tendency of the flange 236 to act as a lever pivoting about a fulcrum defined by the intersection of its leftward free edge of the flange 236 with the wall 218.

The essentially simultaneous rupturing of the concentric webs 214 and 220 initiates removal from the convergent wall 218 of a tear strip 218a and this tear strip removal, once initiated, proceeds with an operator applied force smaller than was required to rupture the web 228 such that the tear strip 218a is easily torn away from the remainder of the wall 218, such tear progressing in the counterclockwise direction as the wall 218 is seen in FIGS. 11 and 12.

As described, the web 214 extends without interruption entirely around the panel 216. On the other hand, the web 220 defined by the intersection of the horizontal and vertical undercuts 222 and 224 is preferably designed to extend only approximately 300° in the counterclockwise direction from the right-hand base of the spoke 230. Thus, after the tear strip 218a is progressively in the counterclockwise direction removed from the convergent wall 218 through an angle of 300°, tearing along the web 220 ceases and a further pull on the pull-open ring 234 causes continued tearing only on the web 214 with the consequence that the panel 216 is entirely removed from the mouth of the container formed with the blank 200.

FIGS. 14, 15 and 16 show simplified mold tooling for the injection molding of the container blank 200. As will become apparent, the molding of the container blank 200 and its ejection from the tooling is quite similar to the molding and ejection processes described above with relation to FIGS. 7 through 10. However, whereas the core was retracted from within the container blank 20 as described with reference to FIGS. 7 through 10, the container blank 200 is retracted from the core as will be described below.

The mold tooling of FIGS. 14 through 16 comprises a movable clamp plate 238 which is attached to and driven by the movable platen (not shown) of the molding machine and movable toward and away from a fixed clamp plate 240. An injection nozzle (not shown) is located in a locator ring 242 engaged with a nozzle seat 244 through which molten plastic is injected along a central axis coincident with the axis of the locator ring 242 to form a sprue (not shown) residing in a sprue chamber 246 surrounded by a sprue bushing 248. Molten plastic passing through the sprue chamber 246 is admitted to the mold chamber which shapes the container blank 200 through a conventional gate 250.

The plastic passing through the gate 250 impacts a foot pin 278 which, by reason of a predetermined spacing from the sprue bushing 248 established by the position of the movable clamp plate 238, permits plastic to flow radially outwardly from the gate 250 to form the easy-open closure portion of the container blank 200.

Continued outward and then rearward movement of the molten plastic shapes the inside and outside wall surfaces 202 and 204. The shape of the inside wall surface 204 is determined by an annular core member 252 having an inside shape interfitting the outside shape of the sprue bushing 248. The interfitting relationship between the core 252 and the sprue bushing 248 is fixed by means of a core plate 262 bolted by bolt means not appearing in FIG. 14 to the stationary clamp plate 240.

The shape of the outside container wall surface 202 is determined by the inside wall configuration of a cavity insert 254 having an exterior wall configuration which interfits a surrounding cavity plate 256. Passing through suitably located apertures in the core plate 262 are a plurality of guide pins 258, only one appearing in the drawings. The guide pins 258 are surrounded by bushings 260 by means of which the cavity plate 256 is guided in its movements toward and away from the core plate 262.

A circular force ring 274 and a circular force insert 276 are fitted within a movable force plate 272 at a position coaxial to the central axis of the mold apparatus shown in FIG. 14. The force parts are backed by a force retainer plate 286 affixed to the force plate 272. As those familiar with injection molding apparatus will be aware, the force retainer plate 286 is directly connected by support pillars and rails (not shown) to the movable clamp plate 238 so that any movement of the clamp plate 238 is accompanied by equal movement of the force plate 272. The force insert 276 has an eccentrically located bore for receiving the foot pin 278. The eccentric passage of the foot pin 278 through the force insert 276 provides a relatively large, somewhat crescent shaped surface on the force insert into which is milled an annular groove 282 serving as a mold for forming the pull-open ring 234. A suitable passageway located in the face of the force insert 276 which confronts the closure panel 216 then being molded allows the molten plastic to flow laterally to enter and fill the groove 282 while, at the same time, forming the spoke 230 as well as its reinforcing flange 236.

Inasmuch as the mold construction required for the formation of pull-open rings, such as the pull-open ring 234, is already well known in the art, no effort to more particularly illustrate the force ring 274 and the force insert 276 appears required for the present description. It can be noted, however, the the foot pin 278 includes a foot plate 280 which cooperates with the force insert 276 and the pull-open ring mold groove 282 formed in the force insert 276 to positively define the molded shape of the pull-open ring 234.

FIG. 14 illustrates the position of the parts of the mold apparatus at the time molten plastic is injected into the mold to form the container blank 200. It is to be noted, of course, that this molding procedure results in formation of the container chime 208, the closure panel 216, and all of the features of the container blank 200 heretofore discussed. It can be noted in particular that the chime 208 is shaped at a parting line between the cavity member 256 and the movable force ring 274 and force insert 276, the larger portion of the chime 208 being formed in surrounding relation to the mold surface of the force insert 276. It can also be noted that the interfit between the chime 208 and the force insert 276 would ordinarily allow an easy separation of the force ring from the chime 208 except for the presence of the freshly molded spoke 230 and pull-open ring 234.

The freshly molded container blank 200 is removed from the core member 252 and then ejected as follows. With continued reference to FIG. 14, the movable clamp plate 238 is moved away from the fixed clamp plate 240 as indicated by the large arrow adjacent the movable clamp plate 238, which thereupon, due to its rigid connection therewith, causes the force plate 272 along with the force ring and cavity insert to also move in the same direction. This draws the movable force plate 272 and related force parts away from the core 252. During the initial portion of this motion, the cavity member 256 follows, and is thus maintained in abutment with the force plate 272, under the bias of plural compression springs 266, only one of which is shown in the drawings. The springs 266 are coiled about bolts 268 that are threadedly fixed to the fixed clamp plate 240 and extend through bores 264 in the core plate 262 and the cavity member 256. Each of the bolts 268 has an enlarged, motion limiting head 270 received within a corresponding bore 271 formed in the face of the cavity plate 256 facing the force plate 272. As apparent, the springs 266 are held in a compression between the fixed clamp plate 240 and the confronting base of the bores 264 during the molding operation and, when the force plate is first moved away from the core, the springs 266 will force the cavity plate 256 and the cavity insert 254 to follow therewith until such time as the bases of the bores 271 strike the confronting surfaces of the enlarged bolt heads 270. The extent to which the cavity plate 256 follows the force plate 272 under the drive provided by the springs 266 is indicated by phantom lines such as phantom lines 273. During such motion, the chime 208 at the closure end of the container blank 200 is positively driven by virtue of engagement therewith by the adjacent surface of the cavity insert 254 so that, during such initial motion, the container blank 200 is positively driven in such manner as to begin being stripped from the core 252.

At substantially the same time as the force plate 272 begins to move away from the core 252, a source of air under pressure, not shown, connected to a threaded bore 302 located in the body of the stationary clamp plate 240 is activated to deliver air under pressure to an annular groove 304 formed in the body of the sprue bushing 248. The adjacent end of the sprue bushing 248 is slightly undersized to allow the air under pressure delivered to the annular groove 304 to flow toward the end wall of the container blank 200 as if to blow the freshly molded container blank 200 off the core 252.

As previously described in relation to FIGS. 7 through 10, the pressurized air is not fully effective until there is a spacing between the core 252 and the sprue bushing 248 on the one hand, and the container end wall on the other hand, so that the pressurized air can act against the entire end wall and, as already noted, the creation of such spacing is assured by virtue of the movement of the cavity insert 254 and the cavity plate 256 during the initial motion of the force plate away from the core. It may be noted that during this initial motion, there are substantial frictional forces augmented by cooling of the container blank tending to cause the container blank to seize upon the core 252 so that the force provided by the springs 266 augmented by the pressurized air is quite substantial in order to ensure the initial stripping of the container blank 200 from the core 252.

The movement of the movable clamp plate 235 proceeds continuously and uninterruptedly, and FIG. 15 illustrates the condition of the mold assembly a short time after motion of the cavity plate 256 is stopped by engagement of the bolt heads 270. Thus, FIG. 15 shows one of the bolt heads 270 engaging the cavity plate, shows the consequent gap opened between the cavity plate 256 and the core plate 262, and shows the manner in which a continuing flow of air under pressure to the bore 302 had continued to press the container blank against the force insert 276 as it moves away from the core 252. Although the retention of the chime 208 between the core and the force is instrumental in retaining the container blank against the force insert 276, such is unnecessary after the initial separation of the container blank 200 from the core 252 has overcome the tendency of the container blank to seize upon the core 252 and has assured that the pressurized air can act against the entire container closure panel.

By an examination of FIG. 15, it can be noted that the only appreciable force, at the cycle time represented by FIG. 15, acting on the container blank 200 to maintain it in abutment with the force insert 276, results from the air pressure continuously being introduced through the bore 302, and it can be appreciated that this pressure must be adequate to continuously overcome any sliding friction continuing to exist between the inside and outside walls of the container blank 200 and the cavity insert 254 or the core 252.

Ultimately, the container blank 200 is completely removed from the core 252 so that it may be ejected from the force insert 276. Such ejection is accomplished by two steps, the first being the movement of an ejector plate 289 and an ejector retainer plate 288 toward the core 252 as indicated by the large arrow on the ejector plate 289 in FIG. 16. The foot pin 278 is carried by the ejector plate 289 and, accordingly, moves therewith so as to push the container blank off the force insert 276. This motion also moves the freshly molded pull-open ring 234 away from the force insert 276. However, this motion does not entirely free the container blank 200 so that it may fall because the presence of the foot plate 280 behind the molded pull-open ring 234 continues to interfere with a free fall of the container blank 200.

In order to ensure that the container blank 200 will fall away from the foot plate 280, an air pin or nozzle 284 is mounted on the ejector plate 289 and the ejector retainer plate 288 and moves therewith from a position within which its free end is located in the force plate 272 to a position as shown in FIG. 16 wherein its free end is extended from the force plate 272 simultaneously, of course, with the extension of the foot pin 278. The air nozzle 284 has an internal bore 285 which communicates with an air pressure supply, not shown, connected to a threaded cavity 287 located in the body of the ejector plate 289. By means of an angularity associated with the bore 285, air under pressure communicated to the air nozzle 284 is directed toward the foot pin 278. Release of air under pressure from the bore 285 when the air nozzle 284 is extended from the force plate 272 causes a jet of air to be directed generally toward the closure panel 216. Such jet of air is found effective to induce the molded container blank to fall downwardly over the foot pin 278 in the general direction indicated by the arrow 310 in FIG. 16.

The aforementioned ejection operation is caused by movement of a knock-out bar 308 that is driven by the molding machine in conventional fashion and that extends through a bore in the movable clamp plate 238 and abuts the confronting face of the ejector plate 289, such knock-out bar 308 moving in the direction of the arrow marked thereon in FIG. 16.

After ejection of the container blank 200, the mold is closed by returning the parts thereof to their positions shown in FIG. 14 in readiness for the molding of another container blank 200. The return of the parts is accomplished by motion of the movable clamp plate 238 toward the core 252. During this motion, the tooling parts shown in FIG. 16, including the force and force retainer plates 272 and 286 and the ejector and ejector retainer plates 289 and 288 advance toward the core 252. The advancing motion of the ejector plate 289 is limited by means of a return pin 294 affixed thereto which, as shown in FIG. 14, prevents the ejector plate from advancing any further toward the core 252 when the pin 294 strikes the confronting face of the cavity plate 256. There may be a plurality of such return pins 294. It may be noted that the return pins serve also to prevent the foot pin 278 from striking the confronting surfaces of the core 252 and the sprue bushing 248 as the mold closes. Stop buttons 306 may be mounted on the ejector plate 289 to maintain a spacing between the clamp plate 238 and the ejector plate 289.

It should be noted that the tooling illustrated in FIGS. 14 through 16 is designed to prevent doming of the container end panel in a manner similar to that described above with reference to the tooling illustrated in FIGS. 7 through 10. Thus, as shown best in FIG. 15, when the container blank 200 is being blown off the core 252, the end panel 216 is supported by force assembly parts in intimate contact therewith so that doming is not possible. For reasons already mentioned, the prevention of doming avoids the tendency of the side walls of a domed container to draw against the core. Dome prevention may also produce more uniform and desirable end products.

As known to those familiar with molding apparatus of this type, various means may be provided for cooling parts of the mold apparatus and no effort is made to illustrate the same in any detail herein. However, it may be noted that a baffle 312 is mounted by a baffle head 314 in the foot pin 278, such baffle cooperating to properly direct a flow of coolant through the foot pin.

The terminology used in this description and in the claims that follow is essentially standard. However, the terms "core" and "force" are generally considered to be synonymous and to refer to the male half of a mold. The term "cavity" typically refers to the female part of the mold. Generally, the "core" or "force" forms the internal portion of a container and the "cavity" forms the external surfaces of the container. Because of the unusual configuration of the containers of this invention, the foregoing language does not conveniently and precisely apply to the tooling. Particularly, the parts that define the outer surfaces of a container end panel function partly as a "core" or "force" and partly as a "cavity." Therefore, to avoid a confusion of terms, the mold parts which cooperate to form the inside of the container are referred to as "core" parts. These would include the sprue bushing in the tooling shown in FIGS. 14 through 16. The parts surrounding the core that cooperate with the core to define the container side walls are referred as "cavity" parts. The remaining parts that cooperate to form generally the outside of the end panel and portions and the chime are referred to as "force" parts. Although not so previously identified, the force assembly of FIG. 7 includes the sprue bushing 54, the stripper plate 94, the stripper retainer ring 92, the stripper ring 90, and the cavity insert 88, in addition to the force plate 98. In the tooling shown in FIGS. 14 through 16, the force assembly includes the parts identified as force parts, such as the force plate 272 and the force retainer plate 286, and also the foot pin 278.

Although the preferred embodiments of this invention have been described, it will be understood that various changes may be made within the scope of the appended claims.

Having thus described my invention, I claim:

1. A one-piece injection molded plastic container blank comprising a tubular body having one end closed and one end open, said body having an outwardly projecting chime surrounding the closed end thereof and an outwardly projecting flange surrounding the open end thereof, the surface of said flange distal said chime diverging outwardly with increasing distance from said chime, the exterior surface of said tubular body being substantially right-cylindrical from said chime to said flange and the surface of said flange proximal said chime intersecting said right-cylindrical exterior surface to form an obtuse included angle with said substantially right-cylindrical exterior surface.

2. The container blank of claim 1 wherein the surface of said flange distal said chime is an uninterrupted extension of the interior surface of said tubular body.

3. The container blank of claim 1 formed of high-density polyethylene.

4. The container blank of claim 1 wherein the closed end of said tubular body comprises a closure panel surrounded by said substantially right-cylindrical exterior surface and merging to become one-piece with the interior surface of said tubular body intermediate said chime and said flange.

5. The container blank of claim 4 wherein the interior surface of said tubular body is axially parallel to within 6 minutes of one degree to said substantially right-cylindrical outer surface between said flange and said closure panel.

6. The container blank of claim 1 wherein said obtuse included angle measured in any plane common to the axis of said substantially right-cylindrical exterior surface is about 165°.

7. The container blank of claim 1 wherein the outer reach of said chime from said substantially right-cylindrical exterior surface exceeds the outer reach of said flange from said substantially right-cylindrical exterior surface.

8. A container having an injection molded plastic body part including a tubular portion having at one end thereof closure means one-piece with said tubular portion, said tubular portion having at the opposite end thereof outwardly projecting flange means one-piece with said tubular portion, said container further including a sheet material closure having a double-seamed juncture with said flange, said tubular portion having an outwardly projecting chime one-piece therewith which surrounds said closure means, said tubular portion having a substantially right-cylindrical outer surface extending from said chime to said flange, said first closure being an easy-open closure.

9. The container of claim 8 wherein the outward extent of said chime from said substantially cylindrical surface approximately equals the outward extent of said double-seamed juncture from said cylindrical surface.

10. The container of claim 9 wherein the axial extent of said chime approximately equals the axial extent of said double-seamed juncture.

11. A molded one-piece plastic container blank comprising a tubular body open at one end thereof and having integrally formed closure means closing the opposite end thereof, said body including a chime surrounding said opposite end, said closure means including a closure panel spaced inwardly of said container from said chime and a relatively thin and thereby weakened first web bridging the space between said chime and said closure panel and having uninterruptedly continuous junctures with each of said chime and said closure panel, said closure panel having an integrally formed side wall which is inwardly convergent from said web, said side wall having an outer surface notched to define a second web spaced from and extending parallel to said first web, said side wall having a groove defining a third web therein extending from said first web to said second web, and pull open means one-piece with said side wall disposed adjacent said third web and manually pullable for rupturing said first, second and third webs.

12. The molded container blank of claim 11 wherein said first web is a circular web, and said second web extends circularly parallel to said first web for an angle less than 360° measured from the juncture of said third web with said second web so that rupture of said second web terminates before rupture of said first web is completed with the consequence that manual pulling of said pull means can entirely free said closure panel from said container.

13. The container blank of claim 11 wherein said pull-open means comprises a spoke member projecting into and surrounded by said side wall, said pull-open means further including flange means one piece with said spoke member and projecting laterally from said spoke member, one end of said flange means one piece with said side wall, said third web rupturable by reason of a lateral movement of said spoke member about the juncture of said flange means with said side wall.

14. The container blank of claim 13 including finger engageable ring means one piece with said spoke member at the end thereof which is most remote from said side wall.

15. A molded one-piece plastic container blank comprising a tubular body open at one end thereof and having integrally formed closure means closing the opposite end thereof, said body including a chime surrounding said opposite end, said closure means including a closure panel spaced inwardly of said container from said chime and a relatively thin and thereby weakened first web bridging the space between said chime and said closure panel and having uninterruptedly continuous junctures with each of said chime and said closure panel, said closure panel having an integrally formed side wall which is inwardly convergent from said web, said closure panel having a notch facing inwardly of said container defining a second web spaced from and extending parallel to said first web, said side wall having groove means defining connecting web means extending from said first web to said second web, and pull open means one-piece with said side wall disposed adjacent said connecting web means and manually pullable for rupturing said first web, said second web, and said connecting web means.

16. The molded container blank of claim 15 wherein said first web is a circular web, and said second web extends circularly parallel to said first web for an angle less than 360° measured from the juncture of said connecting web means with said second web so that rupture of said second web terminates before rupture of said first web is completed with the consequence that manual pulling of said pull means can entirely free said closure panel from said container.

17. The container blank of claim 15 wherein said pull-open means comprises a spoke member projecting into and surrounded by said side wall, said pull-open means further including flange means one piece with said spoke member and projecting laterally from said spoke member, one end of said flange means one piece with said side wall, said connecting web means rupturable by reason of a lateral movement of said spoke member about the juncture of said flange means with said side wall.

18. The container blank of claim 17 including finger engageable ring means one piece with said spoke member at the end thereof which is most remote from said side wall.

19. The molded container blank of claim 11, 12, 13, 14, 15, 16, 17 or 18 wherein said one end of said tubular body has outwardly projecting flange means one piece with said tubular body for attachment of a sheet material closure thereto.

20. The molded container blank of claim 19 wherein said plastic is high-density polyethelene.

21. The molded container blank of claim 11, 12, 13, 14, 15, 16, 17, or 18 wherein said plastic is high-density polyethelene.

* * * * *

UNITED STATES PATENT AND TRADEMARK OFFICE
CERTIFICATE OF CORRECTION

PATENT NO. : 4,380,303
DATED : April 19, 1983
INVENTOR(S) : David O. Allen et al.

It is certified that error appears in the above-identified patent and that said Letters Patent are hereby corrected as shown below:

Column 1, line 28, after "part" delete "in".

Column 1, line 41, "formed" should be ---forced---.

Column 4, line 7, "inclined" should be ---included---.

Column 4, line 55, "has" should be ---had---.

Column 6, line 14, "so" should be ---as---.

Column 7, line 59, "righward" should be ---rightward---.

Column 9, line 36, "25" should be ---52---.

Column 13, line 27, "surface" should be ---surfaces---.

Signed and Sealed this

Twenty-seventh Day of December 1983

[SEAL]

*Attest:*

GERALD J. MOSSINGHOFF

*Attesting Officer*   *Commissioner of Patents and Trademarks*